US006876169B2

(12) United States Patent
Gallegos-Lopez et al.

(10) Patent No.: US 6,876,169 B2
(45) Date of Patent: Apr. 5, 2005

(54) METHOD AND CONTROLLER FOR FIELD WEAKENING OPERATION OF AC MACHINES

(75) Inventors: Gabriel Gallegos-Lopez, Alexandria, IN (US); James E. Walters, Carmel, IN (US); Fani S. Gunawan, Westfield, IN (US)

(73) Assignee: Delphi Technologies, Inc., Troy, MI (US)

(*) Notice: Subject to any disclaimer, the term of this patent is extended or adjusted under 35 U.S.C. 154(b) by 106 days.

(21) Appl. No.: 10/341,997

(22) Filed: Jan. 14, 2003

(65) Prior Publication Data

US 2004/0135538 A1 Jul. 15, 2004

(51) Int. Cl.[7] .............................................. H02P 7/36
(52) U.S. Cl. ...................... 318/701; 318/609; 318/811; 318/254; 388/928.1
(58) Field of Search ................................ 318/439, 138, 318/254, 685, 696, 700, 720–724, 432, 609, 717, 805, 807, 727, 798–801

(56) References Cited

U.S. PATENT DOCUMENTS

| | | | |
|---|---|---|---|
| 5,274,317 A | | 12/1993 | Utley et al. |
| 5,479,081 A | * | 12/1995 | Seibel et al. ................ 318/805 |
| 5,532,570 A | * | 7/1996 | Tajima et al. ............... 318/809 |
| 5,532,571 A | * | 7/1996 | Masaki et al. .............. 318/809 |
| 5,585,708 A | * | 12/1996 | Richardson et al. ........ 318/800 |
| 5,627,446 A | | 5/1997 | Deng et al. |
| 5,949,210 A | | 9/1999 | Gataric et al. |
| 5,965,995 A | * | 10/1999 | Seibel et al. ................ 318/805 |
| 6,008,618 A | * | 12/1999 | Bose et al. .................. 318/805 |
| 6,362,590 B2 | * | 3/2002 | Nozari ....................... 318/609 |
| 6,407,531 B1 | | 6/2002 | Walters et al. |
| 6,429,620 B2 | * | 8/2002 | Nakazawa ................... 318/701 |
| 6,445,155 B1 | | 9/2002 | Williams et al. |
| 6,541,937 B2 | * | 4/2003 | Kato .......................... 318/727 |
| 6,566,829 B1 | * | 5/2003 | Naidu et al. ................ 318/432 |
| 6,605,912 B1 | | 8/2003 | Bharadwaj et al. |
| 6,741,060 B2 | * | 5/2004 | Krefta et al. ............... 318/727 |

OTHER PUBLICATIONS

S.W. Novotny and T.A. Lipo, "Vector Control and Dynamics of AC Drives", OXFORD Science Publications, 0-19-856439-2, 2000 (p.p. 317–351).
Joachim Holtz, "Pulsewidth Modulation For Electronic Power Conversion" Proceedings of the IEEE, vol. 82, No. 8, Aug. 1994.

* cited by examiner

*Primary Examiner*—David Martin
*Assistant Examiner*—Eduardo Colon Santana
(74) *Attorney, Agent, or Firm*—Jimmy L. Funke

(57) ABSTRACT

Method for providing current regulation and a current controller (10) for an electric machine (30) are provided. The method includes receiving a state vector time signal (36) indicative of a time interval when a switching state vector is activated and comparing the received state vector time signal to a commanded state vector time signal (38). The method further includes using the result of the comparison to regulate a direct axis current signal (42, 44) input to an electric machine controller. The current controller (10) includes a state vector error comparator for comparing a received state vector time signal to a commanded state vector time signal and generating a state vector time error. This error is processed by a PI controller, coupled to the state vector error comparator, for providing a direct axis current signal output responsive to the state vector time error to an electric machine.

33 Claims, 5 Drawing Sheets

METHOD AND CONTROLLER FOR FIELD WEAKENING OPERATION OF AC MACHINES

BACKGROUND OF THE INVENTION

The present invention is generally related to control of electric machines, and, more particularly, to a controller device and method for providing current control of power converter driven electric machines.

To overcome the disadvantages of DC motors in DC powered applications, it is known to use synchronous machines in either the form of a permanent magnet (PMAC) wound field or a synchronous reluctance machine (SyR) or induction machine (asynchronous) in conjunction with a power inverter. However, such motors typically exhibit nonlinear characteristics and parameter variations due to temperature, magnetic saturation, or both, when operated over a wide operating range. In addition, the variation of drive input values, such as battery voltage, can negatively affect the motor performance and can cause loss of motor control. Accordingly, the use of known vector control techniques, coupled with a pulse width modulation (PWM) strategy and a power inverter, allows the flux producing component and torque producing component of motor current to be decoupled to produce a motor response analogous to that of a DC motor. With the rapid advancement of smaller and faster processors, vector control techniques have become practical for control of synchronous and asynchronous machines.

PMAC machines can be designed to posses a significant field-weakened region. This design approach reduces the inverter size by reducing the required current per phase that correspondingly reduces the drive unit size and cost. The controller, however, must become more sophisticated in order to properly control the drive to maintain high efficiency and acceptable dynamic performance in the field-weakened range. The most efficient operation for a PMAC above its base speed is achieved when the smallest amount of current is used to weaken, or de-flux, the magnetic flux of the magnet. This condition results in operation where the controller operates the machine near the voltage limit of the system. If the available voltage to the inverter is changed or the magnetic flux is varied due to temperature change, the amount of field-weakening current should be adjusted in order to maintain control and high efficiency. The control should also be modified from the traditional approach in order to increase the drive performance and improve stability for the voltage limited condition. The dynamics of the control may be of paramount importance since operation in the voltage limited condition could cause certain undesirable effects, such as voltage saturation, that can cause slow response or loss of machine control.

Synchronous reluctance machines can also be designed to have a significant field-weakened range. Unlike the PMAC, this machine does not have an already established field flux in the form of a permanent magnet, so the torque produced is from reluctance torque. In the field-weakened range, the torque and efficiency are limited by the available bus voltage. If the field can be increased without exceeding a voltage limit, greater efficiency and higher torque can be produced from the machine at a given operating point.

Similarly, induction machines can be designed to have a significant field-weakening range. Like the synchronous reluctance machines, induction machines do not have an already established field flux in the form of a permanent magnet, so the flux has to be built by an $I_{ds}$ (d-axis synchronous) current. Accordingly, the torque produced is a product of $I_{qs}$ (q-axis synchronous) current and flux. In the field-weakened range, the torque and efficiency are limited by the available bus voltage. If the field flux can be increased without exceeding a voltage limit, greater efficiency and higher torque can be produced from the machine at a given operation point.

Thus, means for setting the flux as a function of operating conditions is desired. If too little current is used to weaken the field for a PMAC machine or, analogously, if too much flux current is used in a SyR machine or an induction machine, then control can be lost due to voltage limit conditions. In contrast, if too much current is provided in a PMAC machine or, analogously if too little flux current is used in a SyR machine or an induction machine, then the efficiency will be too low. Importantly, dynamically changing operational parameters, such as varying magnetic characteristics of the machine as the rotor temperature changes or DC supply voltage changes, must be dynamically accounted for to protect against a loss of control of the machine. While look-up tables have been proposed to perform this function, the values stored in the table may not be valid under dynamically changing operating condition.

Accordingly, it would be desirable to provide flux control in response to changing operating conditions in synchronous and asynchronous machines. In particular, it would be desirable to provide dynamic flux control in the field-weakening region of machine operation. It would be further desirable to make the foregoing technique substantially impervious to variations in battery voltage and operating temperature, and parameter variations from machine to machine.

BRIEF SUMMARY OF THE INVENTION

Generally, the present invention fulfills the foregoing needs by providing, in one aspect thereof, a method of controlling current in an electric machine. The method includes receiving state vector time signals indicative of time intervals when switching state vectors are activated. The method also includes comparing the received state vector time signal to a commanded state vector time signal. The method further includes using the result of the comparison to regulate a direct axis current signal input to an electric machine controller.

The present invention further fulfills the foregoing needs by providing, in another aspect thereof, a current controller for an electric machine. The current controller includes a state vector error comparator for comparing a received state vector time signal to a commanded state vector time signal and generating a state vector time error. The current controller also includes a control element, coupled to the state vector error comparator, for providing a direct axis current signal input responsive to the state vector time error to an electric machine controller.

BRIEF DESCRIPTION OF THE DRAWINGS

The features and advantages of the present invention will become apparent from the following detailed description of the invention when read with the accompanying drawings in which.

Figure 1:
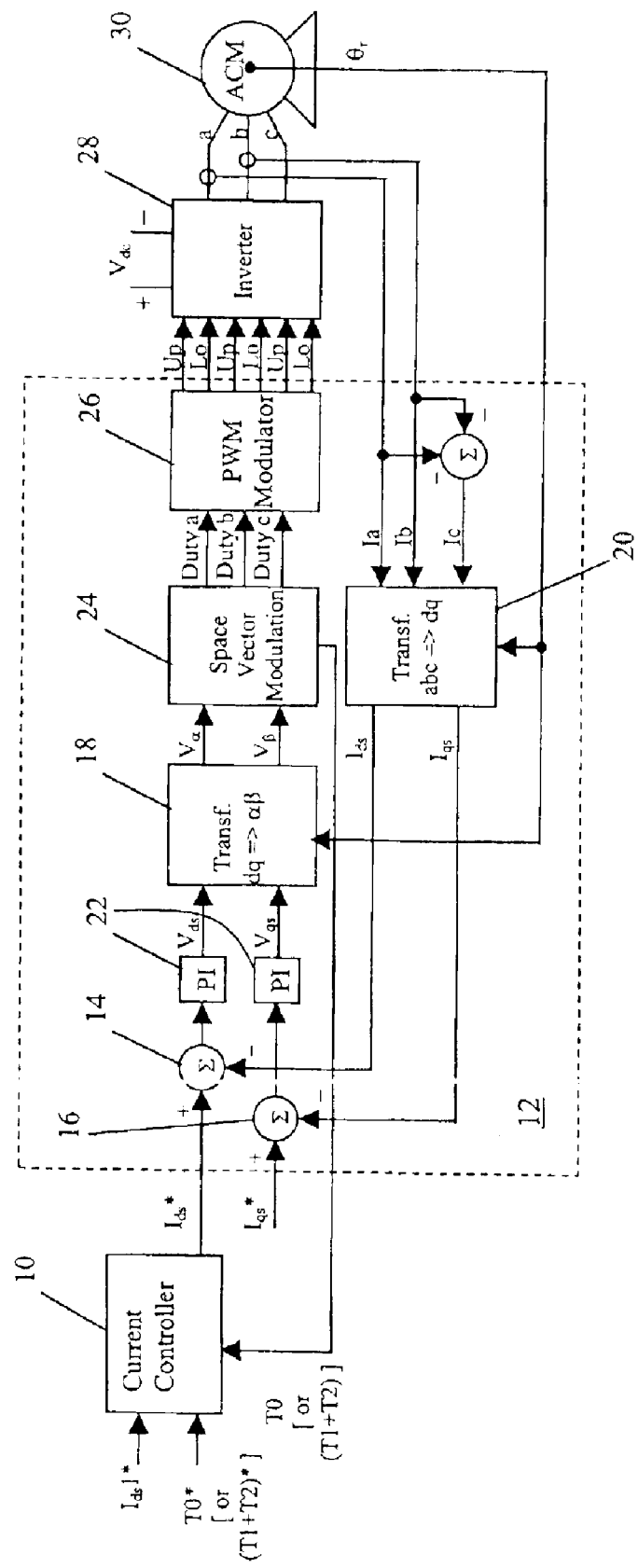
FIG. 1 illustrates a block diagram representation of one exemplary embodiment of a current controller as applied to an exemplary AC machine controller.

In certain situations, for reasons of computational efficiency or ease of maintenance, the ordering of the blocks of the illustrated flow charts could be rearranged or moved inside or outside of the illustrated loops by one skilled in the art. While the present invention will be described with reference to the details of the embodiments of the invention shown in the drawing, these details are not intended to limit the scope of the invention.

DETAILED DESCRIPTION OF THE INVENTION

In general, a current controller embodying aspects of the present invention controls a d-axis current provided to an alternating current (AC) machine controller. In particular, the invention dynamically controls the d-axis current to limit the back EMF generated by the AC machine when the machine is operating in the field-weakening region. In an aspect of the invention, the current regulator can use either the state vector T0 or the sum of state vectors T1 and T2 (T1+T2) [where T0=1-(T1+T2), 0<=T0<=1, and 1 represents 100% of the time available in a respective switching period] provided by a state vector modulator. In the field-weakening region, a current regulator commands the direct axis current by holding the phase voltage magnitude to a given value. It is preferable to hold the phase voltage magnitude to a maximum voltage available from a DC power source to provide maximum efficiency. Accordingly, the present invention dynamically controls the flux in the field-weakening region by controlling either T0 or (T1+T2), where the sum of T1 and T2 is proportional to the phase magnitude voltage, and T0 is inversely proportional to the phase magnitude voltage. Consequently, to hold the phase magnitude voltage to a maximum value, T0 needs to be zero or, conversely, the sum of T1 and T2 needs to be 1.

FIG. 1 illustrates a block diagram representation of one exemplary embodiment of a current controller 10 as applied to an exemplary AC machine controller 12. In FIG. 1, a quantity indicated with a superscript asterisk is a commanded quantity to be controlled to. Quantities without a superscript asterisk indication are actual quantities. As shown in FIG. 1, the current controller 10 receives a commanded direct (d) axis current reference ($I_{ds}1^*$), a reference zero state vector time (T0*), and a feedback zero state vector time (T0). The values of the commanded d-axis current reference $I_{ds}1^*$ and the reference zero state vector time T0* may be externally derived by a system master controller (not shown). A d-axis current reference ($I_{ds}^*$) generated by the current controller 10 and a quadrature (q) axis current reference ($I_{qs}^*$) are then provided as inputs to the machine controller 12. The value of the q-axis current reference $I_{qs}^*$ may be externally derived by a system master controller (not shown). In an aspect of the invention the signals T0*, and T0 can be replaced by (T1+T2)*, and (T1+T2) respectively.

The d-axis current reference $I_{ds}^*$ and a feedback current signal $I_{ds}$ are each respectively applied to a subtractor 14 to generate a difference output signal. It will be appreciated that the difference output signal from subtractor 14 represents an error signal between the d-axis current reference signal $I_{ds}^*$ and the feedback current signal $I_{ds}$. Similarly, the q-axis current reference $I_{qs}^*$ is processed by a subtractor 16 that receives a feedback current $I_{qs}$. In this case, the difference output signal from subtractor 16 represents an error signal between the q-axis current reference $I_{qs}^*$ and the feedback current signal $I_{qs}$. It will be understood that the subtracting operation respectively executed by subtractors 14, 16 and other such devices described below may be executed by a summer having one inverting input terminal and one non-inverting input terminal. It will be further understood that any of the various arithmetic and logical operations in current controller 10 and machine controller 12 may be conducted through respective software modules as may be executed in a suitable microprocessor and such operations need not be executed through hardware modules.

By way of example and not of limitation, a vector controller may comprise components such as respective voltage and current transformation units 18 and 20, and proportional plus integral (PI) current regulators 22, each such component using techniques well understood by those skilled in the art. For readers who desire further background regarding vector control techniques, reference is made to Chapters 5 and 6 of a textbook by D. W. Novotny and T. A. Lipo, titled "Vector Control and Dynamics of AC Drives", published by Oxford University Press, 1996, which textbook is herein incorporated by reference. In addition, a paper by Joachim Holtz entitled "Pulsewidth Modulation For Electronic Power Conversion," Proceedings of the IEEE, Vol. 82, No. 8, pp. 1194–1214, 1994 offers further background, and is also incorporated herein by reference.

Current transformation unit 20 converts the three-phase currents in the stationary frame into equivalent two-phase orthogonal currents in the synchronous frame. After the transformation is performed, the two orthogonal current signals $I_{qs}$ and $I_{ds}$ in the synchronous frame are respectively applied to the PI current regulators 22 as current feedback signals through subtractors 14 and 16. The output signals from the PI current regulators 22 are then provided to voltage transformation unit 18 and are converted into equivalent two-phase voltage references in the stationary frame. Each respective output signal of voltage transformation unit 18 is then applied to a space vector modulator 24 to generate three respective duty cycle values. The duty cycle values are then applied to a PWM modulator 26 to provide pulse signal to an inverter 28. It will be appreciated that the controller functionality is analogous to having six synchronous timers for respectively generating six-gate pulse signals to the respective gate drive circuits of the inverter 28 that energizes the phases of the AC machine 30. It will be further appreciated that the inverter's legs will be appropriately switched on and off according to the voltage levels of the gate signals from the controller in order to control operation of the AC machine.

Figure 2:
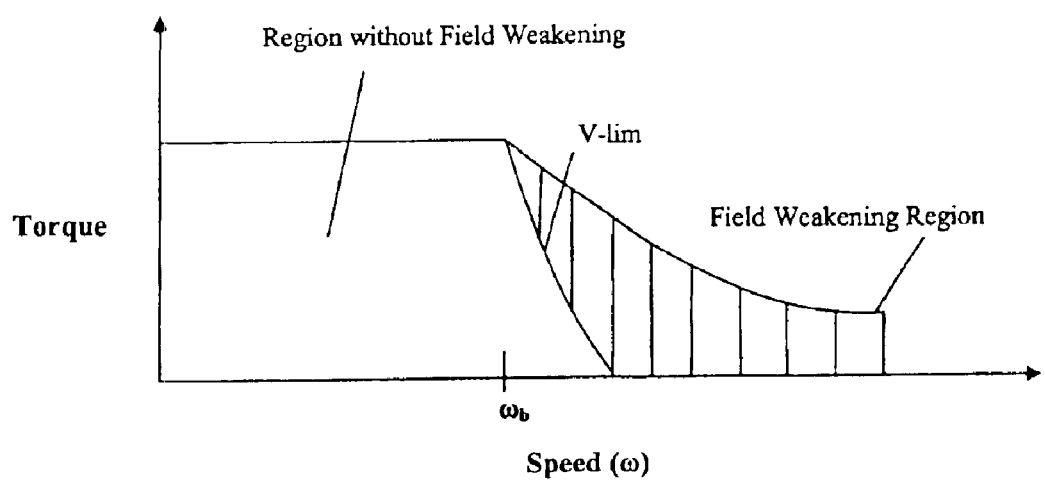
FIG. 2 shows a plot of respective regions used for controlling an AC machine, which plot is used for facilitating understanding of the control system and method of the present invention.

When the synchronous machine 30 is operated in a field-weakening region, an example of which is shown in FIG. 2, a torque generated by the machine 30 is limited by the DC voltage (V_lim) supplying the inverter 28. As a rotor speed ($\omega$) increases past a base speed ($\omega_b$) the torque generated by the machine decreases corresponding to the V_lim curve. However, the torque can be substantially maintained at higher speeds in the field-weakening region if the machine flux is reduced, or "de-fluxed." Accordingly, as known in the art, the d-axis current can be varied to weaken the flux and ensure that the maximum allowable voltage is not exceeded and stable operation of the machine 30 is maintained.

The present inventors have innovatively recognized that by using the zero state vector time T0 in combination with a commanded zero state vector time T0*, (or the sum of the state vectors T1 and T2 and a commanded sum of the state vectors T1* and T2*) and a commanded d-axis current reference signal $I_{ds}1^*$, an AC machine can be dynamically controlled in the field weakening region of operation. Accordingly, the invention advantageously uses parameters already provided in AC machine controllers known in the art. Notably, the space vector modulator 24 of FIG. 1 inherently generates state vectors corresponding to a time interval when the respective state vector is active. For example, the time interval when the zero vector is active corresponds to a condition in the inverter 28 when the machine terminals are shorted and the voltage vector has zero value. Accordingly, because the space vector modulator 24 inherently provides a zero vector state time T0 to the machine 30, the space vector modulator 24 can be tapped to provide a zero vector state time T0 in a feedback loop to the current controller 10. The current controller 10 can use the zero vector time T0 in conjunction with the commanded zero state vector time T0* to generate an appropriate d-axis current reference signal $I_{ds}^*$ responsive to changing operational characteristics.

Figure 3:
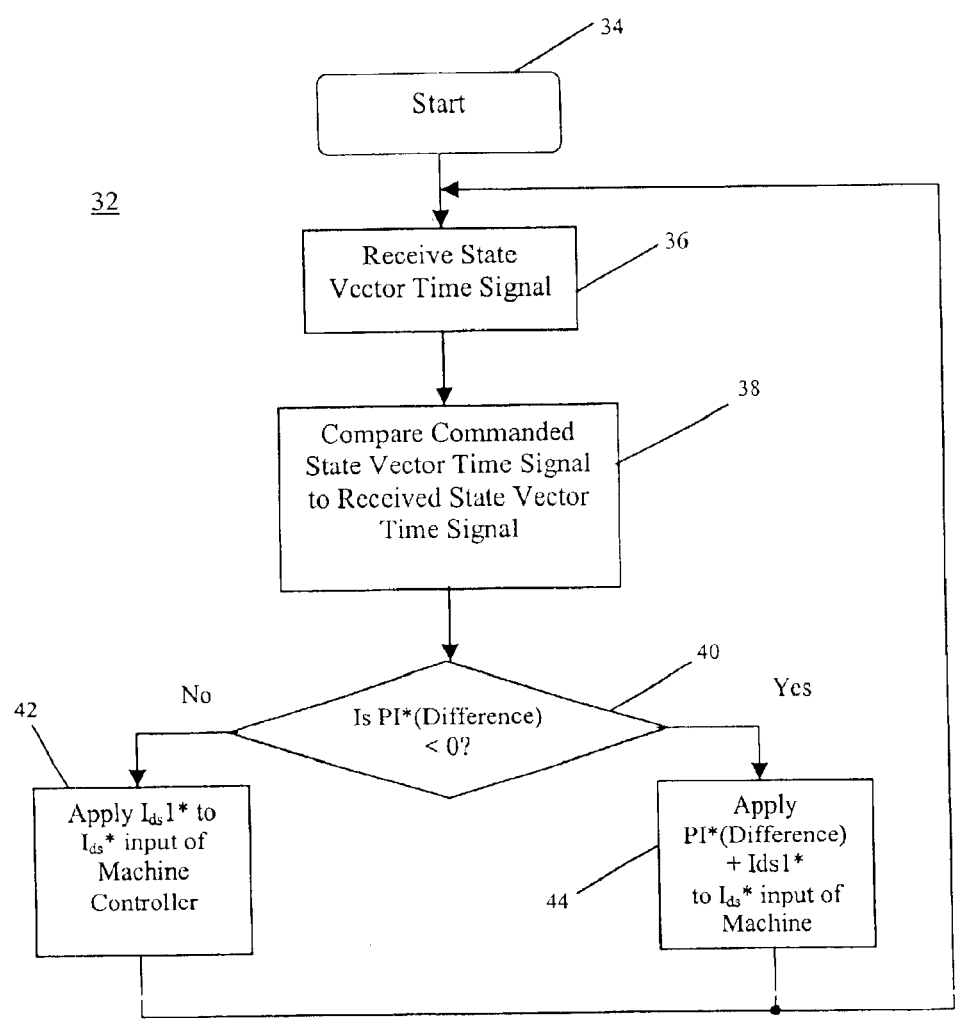
FIG. 3 is a flow chart illustrating exemplary steps that may be executed with the current controller of FIG. 1.

FIG. 3 is a flow chart 32 illustrating exemplary steps that may be executed with the current controller 10 of FIG. 1. Subsequent to start step 34, the method includes receiving a state vector time signal 36 indicative of a time period when a switching state vector is activated. For example, the state vector may be a zero state vector provided by the space vector modulator 24 (FIG. 1) in a feedback loop. In another aspect, the state vector provided by the space vector modulator 24 may be the sum of the state vectors T1 and T2 (T1+T2). The method further includes comparing the received state vector time signal to a commanded state vector time signal 38, for example, by subtracting the commanded zero state vector time signal from the received zero state vector time signal. In another aspect of the invention, the method of comparing the received state vector time signal to a commanded state vector time signal can include subtracting the received state vector time signal (T1+T2) from the commanded state vector time signal (T1+T2)*. Next, the method includes determining if the difference between the received state vector time signal and the commanded state vector time signal, multiplied, or processed, by the PI regulator [PI*(difference)] is a negative value 40. If the PI*(difference) is a negative value, then the PI*(difference) is added to the commanded direct d-axis current reference $I_{ds}1^*$. The result is then applied to the d-axis current input of the machine controller 12 (FIG. 1) in step 44 and the process returns to step 36. If the PI* (difference) is positive, then the commanded d-axis current reference signal $I_{ds}1^*$ is applied to the input of the machine controller 12 (FIG. 1) in step 42 and the process returns to step 36. Accordingly, the d-axis signal supplied to the AC machine 30 (FIG. 1) is actively controlled to de-flux the machine 30 in the field weakening region to provide extended speed range, and to prevent the controller 12 from running out of voltage in the field weakening region.

Figure 4:
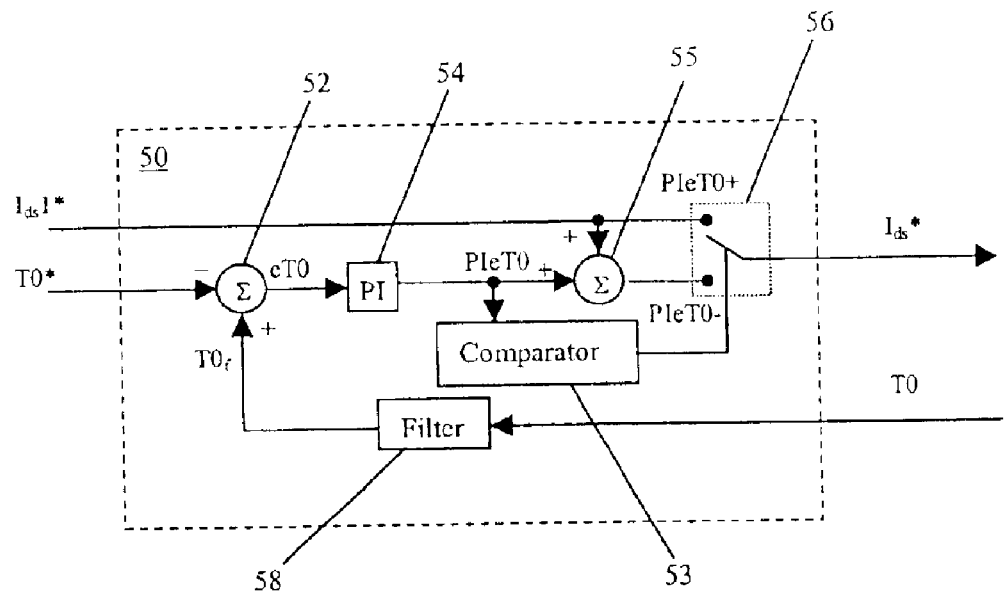
FIG. 4 illustrates further details regarding one exemplary embodiment of the current controller of FIG. 1.
Figure 5:
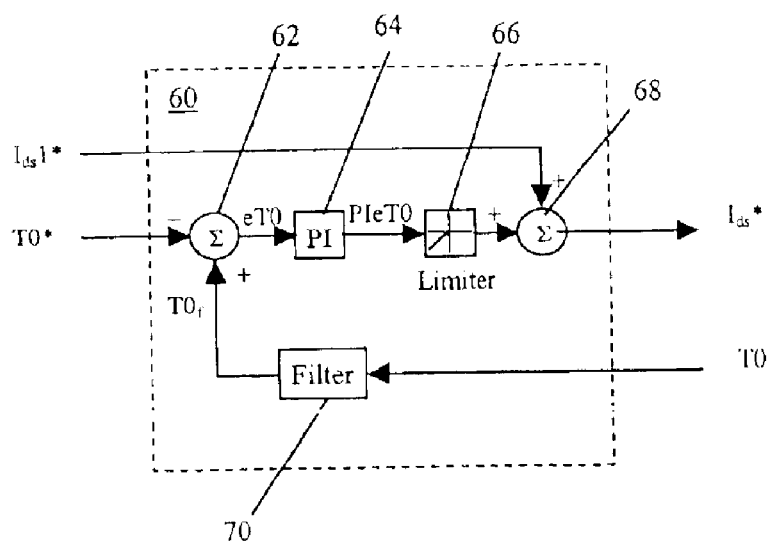
FIG. 5 illustrates further details regarding another exemplary embodiment of the current controller of FIG. 1.

Turning now to FIGS. 4 and 5, exemplary embodiments of the current controller are depicted. FIG. 4 illustrates further details regarding one exemplary embodiment of the current controller 10 of FIG. 1. The current controller 50 includes a summer 52, a proportional-integral (PI) regulator 54, a summer 55, a switch 56, and, in one aspect of the invention, a filter 58. In the embodiment, the current controller 50 receives, as inputs, a commanded direct (d) axis current reference $I_{ds}1^*$, a reference zero state vector time T0*, and zero state vector time T0. The values of the commanded d-axis current reference $I_{ds}1^*$ and the reference zero state vector time T0* may be externally derived by a system master controller (not shown). In an aspect of the invention, the zero state vector time T0 is available from the space vector modulator of 24 (FIG. 1) and may be provided as feedback from the machine controller 12 (FIG. 1). For example, the current controller 50 may be configured as a direct axis current control loop having a zero state vector time T0 for feedback.

In another aspect of the invention, the reference zero state vector time T0* is supplied to an inverting terminal of a summer 52 and the zero state vector time T0 is applied to a non-inverting terminal of the summer 52 to generate a difference output signal, or state vector error signal (eT0). In an embodiment, the zero state vector time T0 can be passed through the filter 58, such as a low-pass filter to remove ripple from the zero state vector time T0 signal, before the signal is applied to the non-inverting terminal of the summer 52.

The current controller 50 then determines if the value of the PI state vector error signal, PIeT0, is negative, for example, by using a comparator 53 with a zero reference. In the case of a negative valued PI state vector error signal PIeT0, a switch 56, for example, controlled by the comparator 53, is set to apply the PI state vector error signal PIeT0, summed with the commanded d-axis current reference $I_{ds}1^*$ by the summer 55, to the d-axis current input of the machine controller 12. In an aspect of the invention, applying the PI state vector error signal summed with the commanded d-axis current reference $I_{ds}1^*$ to the d-axis current input of the machine controller 12 includes closing a commanded direct axis current control loop. In the case of a positive valued PI state vector error signal PIeT0, the switch 56 is set to apply the commanded d-axis current reference $I_{ds}1^*$ to the d-axis current input of the machine controller 12. Accordingly, the d-axis signal supplied to the AC machine 30 is actively controlled to de-flux the AC machine 30 in the field weakening region to provide extended speed range and to prevent the controller 12 from running out of voltage in the field weakening region. In an aspect of the invention, the current controller 50 can be implemented by using a (T1+T2)* commanded signal, instead of T0*, and a (T1+T2) feedback, instead of T0, from the Space Vector Modulation Block 24 of FIG. 1. In this case, (T1+T2)* is connected to the non-inverting input of the summer 52, and the feedback (T1+T2) signal is connected to the inverting input of the summer.

FIG. 5 illustrates further details regarding another exemplary embodiment of the current controller 10 of FIG. 1. The current controller 60 includes a state vector time summer 62, a proportional-integral (PI) regulator 64, a limiter 66, a commanded d-axis current summer 68, and, in one aspect of the invention, a filter 70. In the embodiment, the current controller 60 receives, as inputs, a commanded direct d-axis current reference $I_{ds}1^*$, a reference zero state vector time T0*, and zero state vector time T0. The values of the commanded d-axis current reference $I_{ds}1^*$ and the reference zero state vector time T0* may be externally derived by a system master controller (not shown). In an aspect of the invention, the zero state vector time T0 is available from the space vector modulator of 24 (FIG. 1) and may be provided as feedback from the machine controller 12 (FIG. 1). For example, the current controller 60 may be configured as a direct axis current control loop having a zero state vector time T0 for feedback.

In another aspect of the invention, the reference zero state vector time T0* is supplied to an inverting terminal of the state vector time summer 62 and the zero state vector time T0 is applied to a non-inverting terminal of the state vector time summer 62 to generate a difference output signal, or state vector error signal (eT0). In an embodiment, the zero state vector time T0 can be passed through the filter 70, such as a low-pass filter to remove ripple from the zero state vector time T0 signal, before the signal is applied to the non-inverting terminal of the state vector time summer 62. The generated state vector error signal eT0 is then applied to the PI regulator 64 to generate a PI state vector error signal having proportional and integral components. The PI state vector error signal can then be applied to a limiter 66, such as a zero limiter, to limit the PI state vector error signal to values less than zero, or negative values. Accordingly, the limiter 66 passes PI state vector error signal values less than zero, and provides a zero output for PI state vector error signal values of zero or greater than zero. The output of the limiter 66, or limited PI state vector error signal, is then summed with the commanded d-axis current reference $I_{ds}1^*$. For example, the limited PI state vector error signal is applied to a first non-inverting input of the commanded d-axis current summer 68, and the commanded direct d-axis current reference $I_{ds}1^*$ is applied to a second non-inverting input of the commanded d-axis current summer 68. The summation result is then applied to the d-axis current input of the machine controller 12.

Accordingly, in the case of a positive valued PI state vector error signal PIeT0, a signal applied to the d-axis current input of the machine controller 12 has only a commanded d-axis current reference $I_{ds}1^*$ component. In the case of a negative valued PI state vector error signal PIeT0, the signal applied to the d-axis current input of the machine controller 12 includes the summed result of a commanded d-axis current reference $I_{ds}1^*$ and the output of PI regulator 64 (PIeT0). Thus, the d-axis signal supplied to the AC machine 30 is actively controlled to de-flux the AC machine 30 in the field weakening region to provide extended speed range and to prevent the controller 12 from running out of voltage in the field weakening region. In an aspect of the invention, the current controller 60 can be implemented by using a (T1+T2)* commanded signal instead of T0* and a (T1+T2) feedback from the Space Vector Modulation Block 24 of FIG. 1 instead of T0. In this case, (T1+T2)* is connected to the non-inverting input of the summer 62, and the feedback (T1+T2) is connected to the inverting input of the summer.

Figure 6:
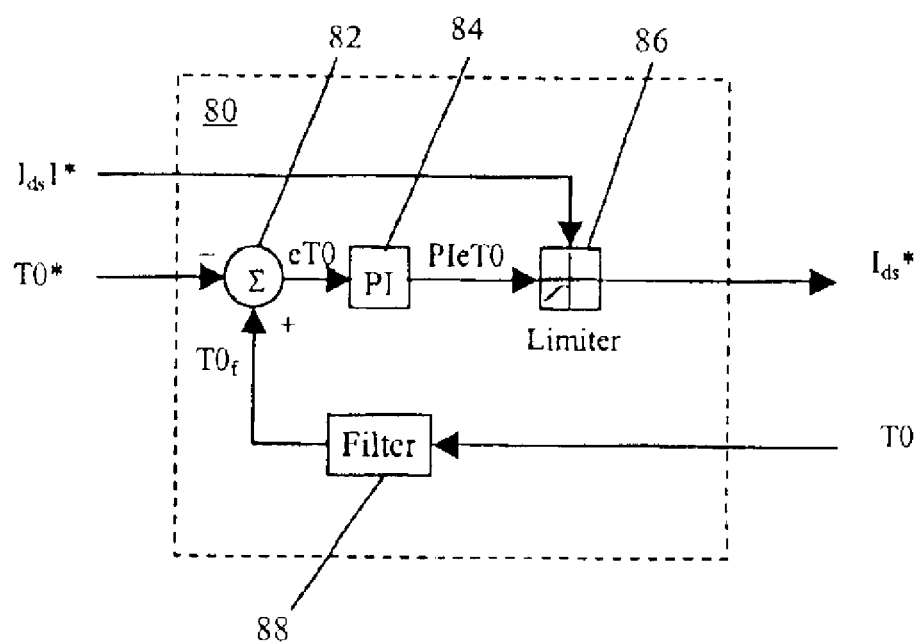
FIG. 6 illustrates further details regarding another exemplary embodiment of the current controller of FIG. 1.

FIG. 6 illustrates further details regarding another exemplary embodiment of the current controller 10 of FIG. 1. The current controller 80 includes a state vector time summer 82, a proportional-integral (PI) regulator 84, a limiter 86, and, in one aspect of the invention, a filter 88. In the embodiment, the current controller 80 receives, as inputs, a commanded direct d-axis current reference $I_{ds}1^*$, a reference zero state vector time T0*, and zero state vector time T0. The values of the commanded d-axis current reference $I_{ds}1^*$ and the reference zero state vector time T0* may be externally derived by a system master controller (not shown). In an aspect of the invention, the zero state vector time T0 is available from the space vector modulator of 24 (FIG. 1) and may be provided as feedback from the machine controller 12 (FIG. 1). For example, the current controller 80 may be configured as a direct axis current control loop having a zero state vector time T0 for feedback.

In another aspect of the invention, the reference zero state vector time T0* is supplied to an inverting terminal of the state vector time summer 82 and the zero state vector time T0 is applied to a non-inverting terminal of the state vector time summer 82 to generate a difference output signal, or state vector error signal (eT0). In an embodiment, the zero state vector time T0 can be passed through the filter 88, such as a low-pass filter to remove ripple from the zero state vector time T0 signal, before the signal is applied to the non-inverting terminal of the state vector time summer 82. The generated state vector error signal eT0 is then applied to the PI regulator 84 to generate a PI state vector error signal having proportional and integral components. The PI state vector error signal can then be applied to a limiter 86, to limit the PI state vector error signal to values less than a predetermined set point value, such as a set point value determined by $I_{ds}1^*$. Accordingly, the limiter 86 passes PI state vector error signal values less than or equal to the set point value of $I_{ds}1^*$. The output of the limiter 86, or limited PI state vector error signal, is then applied to the d-axis current input of the machine controller 12.

For example, in the case of a PI state vector error signal PIeT0 having a value greater than the commanded $I_{ds}1^*$, a signal applied to the d-axis current input of the machine controller 12 includes only the commanded d-axis current reference $I_{ds}1^*$ component, which can be the set point of the limiter 86. In the case of a PI state vector error signal PIeT0 having a value less than the commanded $I_{ds}1^*$, the signal applied to the d-axis current input of the machine controller 12 is the output of PI regulator 84. Thus, the d-axis signal supplied to the AC machine 30 is actively controlled to de-flux the AC machine 30 in the field weakening region to provide extended speed range and to prevent the controller 12 from running out of voltage in the field weakening region. In an aspect of the invention, the current controller 80 can be implemented by using a (T1+T2)* commanded signal instead of T0* and a (T1+T2) feedback from the Space Vector Modulation Block 24 of FIG. 1 instead of T0. In this case, (T1+T2)* is connected to the non-inverting input of the summer 82, and the feedback (T1+T2) is connected to the inverting input of the summer.

Summarizing, the present invention, as exemplarily described above, provides a current controller for coupling to a power converter driven electric machine. By innovatively using an available space vector time signal to control d-axis current, the invention advantageously provides dynamic flux control in response to changing operating conditions in an AC machine. As a result, the invention renders an AC machine operating in the field weakening region substantially impervious to variations in battery voltage, operating temperature, and parameter variations from machine to machine.

The present invention can be embodied in the form of computer-implemented processes and apparatus for practicing those processes. The present invention can also be embodied in the form of computer program code containing computer-readable instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose computer, the computer program code segments configure the computer to create specific logic circuits or processing modules.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for controlling current in an electric machine comprising:
    receiving a state vector time signal from a space vector modulator indicative of a time interval when a switching state vector is activated;
    comparing the received state vector time signal to a commanded state vector time signal; and
    using the result of the comparison to regulate a direct axis current signal input to a machine controller.

2. The current control method of claim 1, wherein the electric machine is a vector controlled machine.

3. The current control method of claim 1, wherein the electric machine is a power converter controlled machine.

4. The current control method of claim 1, wherein the state vector time signal comprises a zero vector time signal indicative of a time interval when a zero vector is activated.

5. The current control method of claim 1, wherein the state vector time signal comprises a sum of a first and second space vector time signals indicative of a respective time interval when the first and second space vectors are activated.

6. The current control method of claim 1, further comprising filtering the received state vector time signal.

7. The current control method of claim 1, further comprising using the received state vector time signal as a feedback signal in a commanded direct axis current control loop.

8. The current control method of claim 1, further comprising generating a state vector time error signal.

9. The current control method of claim 8, wherein generating a state vector time error signal further comprises subtracting the received state vector time signal from the commanded state vector time signal.

10. The current control method of claim 8, wherein generating a state vector time error signal further comprises subtracting the commanded state vector time signal from the received state vector time signal.

11. The current control method of claim 8, further comprising:
    generating a proportional-integral state vector error signal comprising proportional and integral components;
    detecting a condition when the proportional-integral state vector error signal has a value equal to or greater than a commanded direct axis current signal; and
    applying the commanded direct axis current signal to the direct axis current input of the machine controller when the proportional-integral state vector error signal has a value equal to or greater than the commanded direct axis current signal.

12. The current control method of claim 11, further comprising:
    limiting the proportional-integral state vector error signal to generate a direct axis current signal; and
    applying the direct axis current signal to the direct axis current input of the machine controller.

13. The current control method of claim 12, wherein limiting the proportional-integral state vector error signal further comprises limiting the proportional-integral state vector error signal to a value of less than the commanded direct axis current signal.

14. A method for controlling current in an electric machine comprising:
    receiving a state vector time signal indicative of a time interval when a switching state vector is activated;
    comparing the received state vector time signal to a commanded state vector time signal;
    using the result of the comparison to regulate a direct axis current signal input to a machine controller;
    generating a state vector time error signal;
    generating a proportional-integral state vector error signal comprising proportional and integral components;
    detecting when the proportional-integral state vector error signal has a negative value;
    generating a direct axis current signal by adding the proportional-integral state vector error signal to the commanded direct axis current signal; and
    applying the direct axis current signal to the direct axis current input of the machine controller when the proportional-integral state vector error signal has a negative value.

15. A method for controlling current in an electric machine comprising:
    receiving a state vector time signal indicative of a time interval when a switching state vector is activated;
    comparing the received state vector time signal to a commanded state vector time signal;
    using the result of the comparison to regulate a direct axis current signal input to a machine controller;
    generating a state vector time error signal;
    generating a proportional-integral state vector error signal comprising proportional and integral components;
    detecting when the proportional-integral state vector error signal has a negative value;
    generating a direct axis current signal by adding the proportional-integral state vector error signal to the commanded direct axis current signal;
    applying the direct axis current signal to the direct axis current input of the machine controller when the proportional-integral state vector error signal has a negative value; and
    wherein applying the direct axis current signal further comprises closing a commanded direct axis current control loop.

16. A method for controlling current in an electric machine comprising:
    receiving a state vector time signal indicative of a time interval when a switching state vector is activated;
    comparing the received state vector time signal to a commanded state vector time signal;
    using the result of the comparison to regulate a direct axis current signal input to a machine controller;
    generating a state vector time error signal;
    generating a proportional-integral state vector error signal comprising proportional and integral components;
    detecting when the proportional-integral state vector error signal has a positive value; and
    applying a commanded direct axis current signal to the direct axis current input of the machine controller when the proportional-integral state vector error signal has a positive value or zero value.

17. A method for controlling current in an electric machine comprising:
- receiving a state vector time signal indicative of a time interval when a switching state vector is activated;
- comparing the received state vector time signal to a commanded state vector time signal;
- using the result of the comparison to regulate a direct axis current signal input to a machine controller;
- generating a state vector time error signal;
- generating a proportional-integral state vector error signal comprising proportional and integral components;
- detecting when the proportional-integral state vector error signal has a positive value;
- applying a commanded direct axis current signal to the direct axis current input of the machine controller when the proportional-integral state vector error signal has a positive value or zero value;
- generating a proportional-integral state vector error signal comprising proportional and integral components;
- limiting the proportional-integral state vector error signal to generate a limited proportional-integral state vector error signal;
- generating a direct axis current signal by adding the limited proportional-integral state vector error signal to a commanded direct axis current signal; and
- applying the direct axis current signal to the direct axis current input of the machine controller.

18. A method for controlling current in an electric machine comprising:
- receiving a state vector time signal indicative of a time interval when a switching state vector is activated;
- comparing the received state vector time signal to a commanded state vector time signal;
- using the result of the comparison to regulate a direct axis current signal input to a machine controller;
- generating a state vector time error signal;
- generating a proportional-integral state vector error signal comprising proportional and integral components;
- detecting when the proportional-integral state vector error signal has a positive value;
- applying a commanded direct axis current signal to the direct axis current input of the machine controller when the proportional-integral state vector error signal has a positive value or zero value;
- generating a proportional-integral state vector error signal comprising proportional and integral components;
- limiting the proportional-integral state vector error signal to generate a limited proportional-integral state vector error signal;
- generating a direct axis current signal by adding the limited proportional-integral state vector error signal to a commanded direct axis current signal;
- applying the direct axis current signal to the direct axis current input of the machine controller; and
- wherein limiting the proportional-integral state vector error signal further comprises limiting the proportional-integral state vector error signal to a value of less than or equal to zero.

19. A current controller for an electric machine comprising:
- a space vector modulator generating a state vector time signal indicative of a time interval when a switching state vector is activated;
- a state vector error comparator for comparing the state vector time signal received from the space vector modulator to a commanded state vector time signal and generating a state vector time error signal; and
- a control element, coupled to the state vector error comparator, for providing a direct axis current signal, responsive to the state vector time error, to a machine controller.

20. The current controller of claim 19, wherein the electric machine is a vector controlled machine.

21. The current controller of claim 19, wherein the electric machine is a power converter controlled machine.

22. The current controller of claim 19, wherein the received state vector time signal comprises a zero vector time signal indicative of a time interval when a zero vector is activated.

23. The current controller of claim 19, wherein the received state vector time signal comprises a sum of a first and second space vector time signals indicative of a respective time interval when the first and second space vectors are activated.

24. The current controller of claim 19, further comprising a filter for filtering the received state vector time signal.

25. The current controller of claim 19, further comprising a commanded direct axis current control loop having a state vector time signal as a feedback signal.

26. The current controller of claim 19, wherein the state vector error comparator is a subtractor for subtracting the received state vector time signal from the commanded state vector time signal.

27. The current controller of claim 19, wherein the state vector error comparator is a subtractor for subtracting the commanded state vector time signal from the received state vector time signal.

28. The current controller of claim 19, wherein the controller further comprises:
- a proportional-integral state vector error signal regulator for generating a proportional-integral state vector error signal comprising proportional and integral components;
- a limiter, coupled to the proportional-integral state vector error signal regulator, for limiting the proportional-integral state vector error signal and providing a limited proportional-integral state vector error signal; and
- a summer, coupled to the limiter, for generating a direct axis current signal responsive to the limited proportional-integral state vector error signal and the commanded direct axis current signal.

29. The current controller of claim 28, wherein the limiter limits the output of the proportional-integral state vector error signal regulator to a value of less than zero or equal to zero.

30. The current controller of claim 19, wherein the controller further comprises:
- a proportional-integral state vector error signal regulator for generating a proportional-integral state vector error signal comprising proportional and integral components; and
- a limiter, coupled to the proportional-integral state vector error signal regulator, for limiting the proportional-integral state vector error signal and providing a direct axis current signal responsive to the limited proportional-integral state vector error signal and the commanded direct axis current signal.

31. The current controller of claim 30, wherein the limiter limits the output of the proportional-integral state vector error signal regulator to a value of less than or equal to the commanded direct axis current signal.

32. A current controller for an electric machine comprising:
- a state vector error comparator for comparing a received state vector time signal to a commanded state vector time signal and generating a state vector time error signal;
- a control element, coupled to the state vector error comparator, for providing a direct axis current signal, responsive to the state vector time error, to a machine controller;
- a proportional-integral state vector error signal regulator, coupled to the state vector error comparator, for generating a proportional-integral state vector time error signal comprising proportional and integral components;
- a zero comparator, coupled to the proportional-integral state vector error signal regulator, to determine when the proportional-integral state vector time error signal has a negative value;
- a summer, for adding the proportional-integral state vector time error signal and the commanded direct axis current signal to generate a direct axis current signal; and
- a switch, coupled to the zero comparator, for applying the direct axis current signal to a direct axis current input of the machine controller when the proportional-integral state vector time error signal has a negative value.

33. A current controller for an electric machine comprising:
- a state vector error comparator for comparing a received state vector time signal to a commanded state vector time signal and generating a state vector time error signal:
- a control element, coupled to the state vector error comparator, for providing a direct axis current signal, responsive to the state vector time error, to a machine controller;
- a proportional-integral state vector error signal regulator, coupled to the state vector error comparator, for generating a proportional-integral state vector time error signal comprising proportional and integral components;
- a zero comparator, coupled to the proportional-integral state vector error comparator, to determine when the proportional-integral state vector time error signal has a positive value; and
- a switch, coupled to the zero comparator, for applying a commanded direct axis current signal to the direct axis current input of the machine controller when the proportional-integral state vector time error signal has a positive value or a zero value.

* * * * *